US 8,974,666 B2

(12) United States Patent
Kono et al.

(10) Patent No.: US 8,974,666 B2
(45) Date of Patent: Mar. 10, 2015

(54) PREPARATIVE SEPARATION/PURIFICATION SYSTEM

(75) Inventors: Yutaka Kono, Kyoto (JP); Masayuki Nishimura, Kyoto (JP); Bob Boughtflower, Ware (GB); Przemyslaw Stasica, Stevenage (GB)

(73) Assignee: Shimadzu Corporation, Kyoto (JP)

( * ) Notice: Subject to any disclaimer, the term of this patent is extended or adjusted under 35 U.S.C. 154(b) by 863 days.

(21) Appl. No.: 12/681,281

(22) PCT Filed: Oct. 2, 2007

(86) PCT No.: PCT/JP2007/001069
§ 371 (c)(1),
(2), (4) Date: Jun. 22, 2010

(87) PCT Pub. No.: WO2009/044425
PCT Pub. Date: Apr. 9, 2009

(65) Prior Publication Data
US 2010/0258485 A1    Oct. 14, 2010

(51) Int. Cl.
*B01D 15/20* (2006.01)
*B01D 15/24* (2006.01)

(52) U.S. Cl.
CPC .............. *B01D 15/203* (2013.01); *B01D 15/24* (2013.01); *B01D 15/20* (2013.01)
USPC .......................... 210/198.2; 210/656; 210/143

(58) Field of Classification Search
CPC ....... B01D 15/203; B01D 15/20; B01D 15/24
USPC ........................ 210/656, 101, 181, 198.2, 143
See application file for complete search history.

(56) References Cited

U.S. PATENT DOCUMENTS 4,380,496 A * 4/1983 Maffet .......................... 210/780
5,039,488 A * 8/1991 Kohr ............................ 422/68.1

(Continued)

FOREIGN PATENT DOCUMENTS

| DE | 101 53 670 A1 | 5/2002 |
|---|---|---|
| JP | 02-122260 A | 5/1990 |
| JP | 2002-202316 A | 7/2002 |
| JP | 2002-257806 A | 9/2002 |
| JP | 2003-149217 A | 5/2003 |
| WO | 2007/026693 A | 3/2007 |

OTHER PUBLICATIONS

PTO 11-2219 translation of Japan Patent No. 2002-257806.*
Translation of WO 2007026693 undated.*
Japanese Office Action dated Jun. 7, 2011, issued for corresponding Japanese Patent Application No. 2009-535885.
Office Action dated Dec. 19, 2011, issued in corresponding United Kingdom Patent Application No. 1006553.0.

*Primary Examiner* — Ernest G Therkorn
(74) *Attorney, Agent, or Firm* — Sughrue Mion, PLLC

(57) ABSTRACT

A solution containing a target compound is passed through a trap column (14) to capture the target compound in the column (14). Thereafter, wash water is introduced in the trap column (14). Then, the setting of a six-port valve (7) is changed and an on/off valve (6) is opened to introduce nitrogen gas through a supply-side passage (8) in the trap column (14). In this stage, the nitrogen gas is warmed by means of a heat-exchange block (10), and the trap column (14) is warmed via a column rack (15). Any water remaining in the trap column (14) is initially thrust upwards by the nitrogen gas, to be extruded from an exit edge (14*b*) and discharged through a discharge-side passage (20). Furthermore, any water adhering to adsorbent or the inner wall surface of the trap column (14) is quickly vaporized and carried away by the nitrogen gas. In this manner, any water remaining in the trap column (14) can be rapidly removed, so that no water will be included in an eluate in the subsequent stage where a solvent with a strong elution power is introduced into the trap column (14) to collect the eluate. Thus, the eluate is rapidly vaporized and dried, so that the target compound in solid forms can be efficiently collected.

7 Claims, 3 Drawing Sheets

(56) References Cited

U.S. PATENT DOCUMENTS

| | | | | |
|---|---|---|---|---|
| 5,223,435 | A * | 6/1993 | Kohr | 436/89 |
| 5,496,733 | A * | 3/1996 | Spandau et al. | 436/52 |
| 6,789,330 | B2 * | 9/2004 | Ally et al. | 34/380 |
| 7,332,013 | B2 * | 2/2008 | Arno et al. | 55/518 |
| 2002/0122745 | A1 | 9/2002 | Takase et al. | |
| 2009/0120851 | A1 * | 5/2009 | Vecziedins et al. | 210/87 |
| 2010/0276350 | A1 * | 11/2010 | Kono et al. | 210/198.2 |
| 2010/0281958 | A1 * | 11/2010 | Kono et al. | 73/61.53 |
| 2010/0300627 | A1 * | 12/2010 | Kono et al. | 159/48.1 |

* cited by examiner

PREPARATIVE SEPARATION/PURIFICATION SYSTEM

CROSS REFERENCE TO RELATED APPLICATION

This application is a National Stage of International Application No. PCT/JP2007/001069, filed on Oct. 2, 2010, the contents of which is incorporated herein by reference in its entirety.

TECHNICAL FIELD

The present invention relates to a preparative separation/purification system for separately purifying and collecting one or more components individually extracted from a solution by a liquid chromatograph.

BACKGROUND ART

For example, in the pharmaceutical industry, preparative separation/purification systems utilizing liquid chromatographs are used to collect samples of a variety of chemically synthesized compounds in order to store those samples in a library or analyze them in more detail. Conventional examples of the preparative separation/purification system are disclosed in Patent Documents 1 and 2.

In these conventional apparatuses, target components (compounds) in a sample solution are temporally separated by a liquid chromatograph. The separated target components are then respectively introduced into different trap columns and temporarily captured therein. Subsequently, a solvent is supplied into each trap column to quickly elute the component from the trap column and collect it in a container. Thus, a plurality of solutions each containing one target component at a high concentration are respectively collected in a plurality of containers. These separately collected solutions are then subjected to a vaporizing and drying process to remove the solvent and collect the target components in solid forms. The vaporizing and drying process normally includes heating the collected solutions or centrifuging them under vacuum.

According to the aforementioned conventional method, however, a single vaporizing and drying process requires a long period of time of, for example, several hours to one day. In the pharmaceutical industry, various efforts have been made to, improve the efficiency of searching for a large number of synthetic compounds for medicinal compounds; for example, the analysis time has been reduced by using faster analysis apparatuses or optimizing the analytical methods. Reducing the time required for the vaporizing and drying process is a critical issue since this process consumes the longest time within the entire process.

One reason why a long period of time is required to vaporize the solvent from the eluate collected in the previously described manner is the presence of water included in the collected eluate. As the solvent for eluting target components captured in a trap column, an organic solvent is often used. As compared to water, organic solvents have much lower boiling points and hence are highly volatile. Therefore, when the target components are dissolved in a pure organic solvent, the vaporizing and drying process requires only a short period of time. On the other hand, if water, which is less volatile, is included in the solvent, the vaporizing and drying process takes a considerable length of time.

In the capturing process using the trap column, the target component is introduced into the trap column with the mobile phase of the preparative liquid chromatograph. In many cases, the mobile phase consists of either water or an aqueous solvent containing water as the main component. In these cases, a certain amount of water remains in the trap column at the completion of capturing the target component. This problem also arises in the widely used technique of introducing water into the passage of the mobile phase at a location before the trap column in order to dilute the mobile phase with water and thereby reduce the elution power of the mobile phase so that the target component can be assuredly captured. In this case, the water remains in the trap column at the completion of capturing the target component. Furthermore, after the target component is captured, it is often necessary to wash the trap column by introducing water into it to remove unnecessary components other than the target one, such as the salts originating from the mobile phase, that are present within the trap column. In this case, the mobile phase in the trap column is replaced by water, so that the trap column becomes filled with the water.

For such a variety of reasons, in many cases, the trap column contains a considerable amount of water after the target component is captured. When such a large amount of water is present in the trap column, supplying an organic solvent into the trap column to elute the target component will naturally result in a large amount of remnant water to be included in the solution exiting from the trap column.

Patent Document 1: Japanese Unexamined Patent Application Publication No. H2-122260

Patent Document 2: Japanese Unexamined Patent Application Publication No. 2003-149217

DISCLOSURE OF THE INVENTION

Problem to be Solved by the Invention

The present invention has been developed in view of the previously described problems, and its objective is to provide a preparative separation/purification system capable of efficiently obtaining a target component in solid forms by minimizing the amount of water contained in an eluate exiting from the trap column so that the process of vaporizing and drying the eluate can be completed in a short period of time even if a large amount of water remains in the trap column with the target component held therein.

Means for Solving the Problems

The present invention aimed at solving the aforementioned problem is a preparative separation/purification system in which a solution containing a target component is passed through a trap column to capture the target component in the trap column and then a solvent having an elution capability is passed through the trap column to elute the target component from the trap column and collect the target component, which is characterized by including:

a) a gas supply means for supplying a drying gas into the trap column in place of the solvent; and b) a control means for controlling the gas supply means, before the solvent for elution is supplied to the trap column with the target component captured therein, so as to supply the drying gas for a predetermined period of time or until a point in time when the inside of the trap column is judged to have been dried.

In a preparative separation/purification task using the preparative separation/purification system according to the present invention, a solution is initially passed through the trap column so that a target component contained in the solution will be captured by an adsorbent in the trap column.

Subsequently, if it is necessary, wash water is introduced into the trap column to replace the solvent (mobile phase) remaining in the trap column with water. These tasks may be performed by either the preparative separation/purification system according to the present invention or another system; in the latter case, a trap column with a target component captured therein is set into the system according to the present invention to perform the subsequent tasks, which will be hereinafter described.

Subsequently, under the command of the controller, a drying gas is supplied into the trap column by the gas supply means. As the drying gas, an inexpensive inert gas, such as nitrogen gas, is preferable. The drying gas supplied into the trap column physically extrudes water from the trap column to the outside. Additionally, the water remaining on the inner wall surface of the trap column and on the adsorbent is vaporized due to direct contact with the drying gas. The resultant vapor is carried away by the drying gas to the outside of the trap column. Thus, the water remaining in the trap column is quickly removed to dry the inside of the column.

The controller continues supplying the drying gas either for a predetermined period of time or until a specific point in time, e.g. until it can be determined from the detection signal of a moisture sensor or similar device provided at the exit-side passage of the trap column that the water removal (or drying) of the trap column has been completed. Subsequently, in place of the drying gas, a solvent with a strong elution capability is supplied into the trap column to elute the target component captured in the trap column, and the eluate is collected. Since, as described previously, water is adequately removed from the trap column before the elution of the target component, the eluate has only the slightest amount of water included therein. Therefore, the target component in solid forms can be obtained by simply vaporizing the solvent which is far more volatile than water.

In one mode of the preparative separation/purification system according to the present invention, the gas supply means includes a passage selection means for changing a passage configuration so that either the drying gas, the solvent or the solution containing the target component is selectively supplied into the trap column.

According to this configuration, it is possible to continuously or automatically perform the previously described sequential process of supplying a solution containing a target component into the trap column to capture the target component in the trap column, replacing the residual solution in the trap column with water (if necessary), almost completely removing water by supplying the drying gas into the trap column, and supplying the eluting solvent into the trap column to elute the target component.

In one preferable mode of the present invention, the preparative separation/purification system further includes a gas-heating means for heating the drying gas supplied into the trap column. In this case, the temperature of the drying gas passing through the trap column is increased, so that the water remaining in the trap column can be more quickly vaporized.

In another preferable mode of the present invention, the preparative separation/purification system includes a column-heating means for heating the trap column. In this case, the trap column is directly heated, so that the water remaining in the trap column will be even more quickly vaporized.

Effect of the Invention

The preparative separation/purification system according to the present invention is capable of quickly removing residual water from the trap column with a target component held therein. Therefore, for example, when a target component captured in the trap column is collected by eluting it with a solvent having a strong elution capability, the eluate will have no water included therein. Since the solvent consists of an organic solvent or similar liquid that vaporizes more quickly than water, it is possible to promptly remove the solvent from the eluate and efficiently collect the target component in solid forms. As a result, the efficiency (throughput) of collecting target components in solid forms is improved.

EXPLANATION OF NUMERALS

1 . . . . Solution Container
2 . . . . Wash Water Container
3 . . . . Eluting Solvent Container
4 . . . . Selector Valve
5 . . . . Pump
6 . . . On/Off Valve
7 . . . . High-Pressure Six-Port Valve
8 . . . . Supply-Side Passage
10 . . . . Heat-Exchange Block
11 . . . . Heater
12 . . . . Temperature Sensor
13 . . . . Gas Temperature Regulator
14 . . . . Trap Column
14a . . . . Inlet End
14b . . . . Outlet End
15 . . . . Column Rack
16 . . . . Heater
17 . . . . Temperature Sensor
18 . . . . Column Temperature Regulator
20 . . . . Discharge-Side Passage
21 . . . . Fraction Collector Head
22 . . . . Two-Way Selector Valve
23 . . . . Preparative Separation Passage
23a . . . . Solution Nozzle
24 . . . . Disposal Passage
25 . . . . Gas Passage
25a . . . . Gas Ejection Nozzle
26 . . . On/Off Valve
27 . . . . Collecting Container
28 . . . . Container Rack
29 . . . . Heater
30 . . . . Temperature Sensor
35 . . . . Control Unit
36 . . . . Operation Unit
37 . . . . Moisture Sensor

BEST MODE FOR CARRYING OUT THE INVENTION

Figure 1:
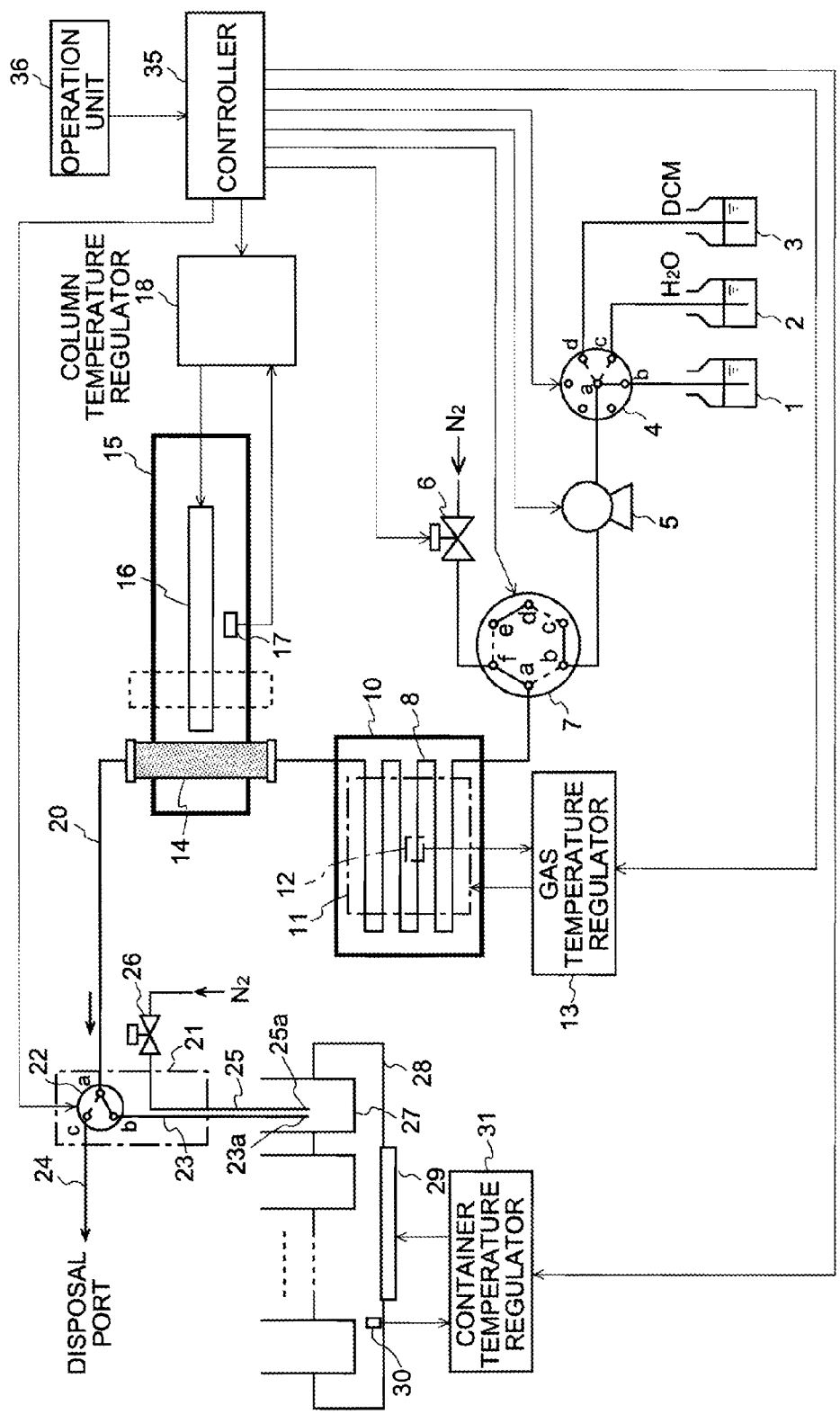
FIG. 1 is a block diagram showing the main components of a preparative separation/purification system according to an embodiment of the present invention.
Figure 2:
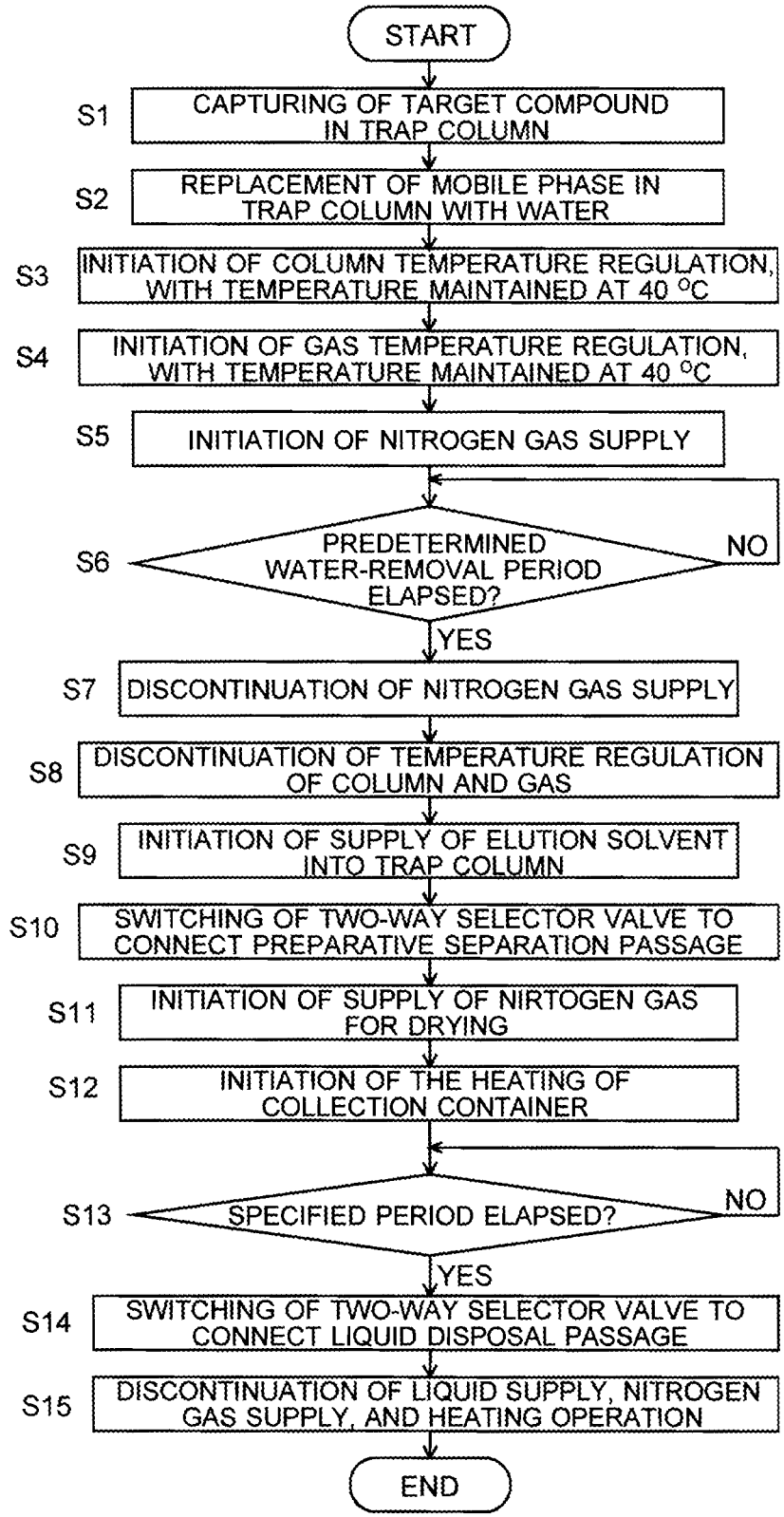
FIG. 2 is a flowchart showing the steps and operations of preparative separation/purification work in the preparative separation/purification system of the present embodiment.

One embodiment of the preparative separation/purification system according to the present invention is hereinafter described in detail with reference to FIGS. 1 and 2. FIG. 1 is a block diagram showing the main components of the preparative separation/purification system in the present embodiment. The present preparative separation/purification system is designed to obtain a target component in purified, solid forms from a solution containing the target component previously separated by a preparative liquid chromatograph (not shown). Alternatively, it is possible to directly connect the preparative liquid chromatograph to the upstream side of the present system so as to directly introduce a solution containing a target component separated by the preparative liquid chromatograph.

A trap column 14 filled with an adsorbent for trapping the target component is held in a substantially vertical position, with its inlet end 14a directed downwards and its outlet end 14b upwards, by a column rack 15 made of a material having a high level of thermal conductivity, such as aluminum. Although FIG. 1 shows only one trap column 14, it is possible to hold two or more trap columns, side by side, as indicated by the dotted line. The column rack 15 is provided with a heater 16 as the heat source and a temperature sensor 17. A column temperature regulator 18 regulates the temperature of the trap column 14 by controlling the heating current supplied to the heater 16 so that the temperature detected by the temperature sensor 17 is maintained at a target level (e.g. 40 degrees Celsius). The column rack 15, the heater 16 and the column temperature regulator 18 correspond to the column-heating means of the present invention.

A supply-side passage 8 connected to the inlet end 14a of the trap column 14 is provided within a heat-exchange block 10 made of a material having a high level of thermal conductivity, such as aluminum. The heat-exchange block 10 is provided with a heater 11 as the heat source and a temperature sensor 12. A gas-temperature regulator 13 regulates the temperature of the gas flowing through the supply-side passage 8 (as will be described later) by controlling the heating current supplied to the heater 11 so that the temperature detected by the temperature sensor 12 is maintained at a target level (e.g. 40 degrees Celsius). The heat-exchange block 10, the heater 11 and the gas temperature regulator 13 correspond to the gas-heating means of the present invention.

The supply-side passage 8 is connected to port a of a high-pressure six-port valve 7, whose port f is supplied with, via an on/off valve 6, a drying gas for drying the inside of the trap column 14. The drying gas should be preferably an inert gas. The present embodiment uses nitrogen gas, which may be replaced with helium, argon or other kinds of inert gas. The passage for supplying the nitrogen gas may be preferably provided with a regulator or similar device for stabilizing the gas supply. The high-pressure six-port valve 7 can be switched between two positions, i.e. between one connection configuration indicated by the solid lines in FIG. 1 and the other connection configuration indicated by the dotted lines. The high-pressure six-port valve 7, the on/off valve 6 and the gas supply source (not shown) correspond to the gas supply means of the present invention.

A solution container 1 holds a solution that has been separated beforehand as stated earlier. The solvent of this solution, which contains a target compound, is mainly composed of a mobile phase used in the preparative liquid chromatograph. A wash water container 2 holds pure water, while an eluting solvent container 3 holds dichloromethane (labeled "DCM" in the figure). A selector valve 4 is provided to select one of the liquids held in the containers 1, 2 and 3 and supply the selected liquid to a passage on which a pump 5 for drawing a liquid at a predetermined flow rate is provided. The liquid drawn by the pump 5 is delivered to port b of the high-pressure six-port valve 7.

A discharge-side passage 20 has one end connected to the outlet end 14b of the trap column 14 and the other end to port a of a two-way selector valve 22 embedded in a fraction collection head 21. A preparative separation passage 23 is connected to port b of the selector valve 22, while a disposal passage 24 leading to a disposal port is connected to port c. The two-way selector valve 22 selectively connects either the preparative separation passage 23 or the disposal passage 24 to the discharge-side passage 20. The other end of the preparative separation passage 23 is a solution nozzle 23a for dripping the supplied solution. A gas ejection nozzle 25a at the end of a gas passage 25 is located close to the solution nozzle 23a. An on/off valve 26 is provided on the gas passage 25. When the on/off valve 26 is opened, a nitrogen gas (or any other inert gas) supplied from a gas cylinder or similar source (not shown) is ejected from the gas ejection nozzle 25a. The solution nozzle 23a and the gas ejection nozzle 25a may have a double-tube structure.

A plurality of collection containers 27 for collecting the separated and purified target compounds are held in a container rack 28. The container rack 28 is provided with a heater 29 and a temperature sensor 30. Based on the temperature monitored with the temperature sensor 30, a container temperature regulator 31 regulates the heating current supplied to the heater 29 so that the collection containers 27 can be heated to appropriate temperatures. The fraction collection head 21, which can be moved in both horizontal and vertical directions by a drive mechanism (not shown), is horizontally moved to a position above any one of the collection containers 27 held in the container rack 28 and then vertically lowered to insert the solution nozzle 23a and the gas ejection nozzle 25a into the selected collection container 27 so that a solution can be dripped into the same container.

Instead of moving the fraction collection head 21, it is also possible to move the container rack 28 so that a solution dripped from the solution nozzle 23a will fall into any one of the collection containers 27 held in the container rack 28.

A controller 35 including a central processing unit (CPU) and other components automatically performs the preparative separation/purification task according to a previously prepared program, by switching the valves 4, 7 and 22, opening or closing the valves 6 and 26, controlling the operation of the pump 5 (flow rate or flow velocity), activating or deactivating the temperature regulators 13, 18 and 31, and setting target temperatures for these regulators. An operation unit 36 allows users to enter the conditions and other information relating to the preparative separation/purification task.

A preparative separation/purification process using the preparative separation/purification system in the present embodiment is hereinafter described with reference to FIG. 2. FIG. 2 is a control flow chart for this automatic separation/purification.

To capture a target compound onto the adsorbent in the trap column 14, the controller 35 initially connects the solution container 1 (port b) and the pump 5 via the selector valve 4 and also switches the high-pressure six-port valve 7 to the connection configuration indicated by the dotted line in FIG. 1. The controller 35 also connects the discharge-side passage 20 (port a) and the disposal passage 24 (port c) via the two-way selector valve 22. In this state, the pump 5 is energized to supply a liquid at a predetermined constant flow rate. The pump 5 draws the solution from the solution container 1 and delivers it through the inlet end 14a into the trap column 14. In this stage, the heater 11 for heating the heat-exchange block 10 and the heater 16 for heating the column rack 15 are both inactive. When the solution passes through the trap column 14, the target compound in the solution is captured by the adsorbent (Step S1). The mobile phase from which the target compound has been removed exits from the outlet end 14b, to be disposed of via the discharge-side passage 20 and the disposal passage 24 to the disposal port.

After the solution is supplied into the trap column 14 for a predetermined period of time or until the solution prepared in the solution container 1 is exhausted, the controller 35 switches the selector valve 4 to connect the wash water container 2 (port c) and the pump 5. Then, the pump 5 draws pure water from the wash water container 2 and delivers it through the inlet end 14a into the trap column 14. By this process, any unwanted water-soluble substance (e.g. a salt) adhered to the adsorbent in the previous process of capturing the target component is removed from the inside of the trap column 14 (Step S2). As a result of supplying the pure water, the mobile phase remaining in the trap column 14 immediately before the initiation of the water supply is replaced with water, and this water eventually fills the trap column 14. The target compound captured on the adsorbent can barely elute into water due to a strong adsorption effect. Therefore, at this point in time, the target compound is still captured in the trap column 14.

Next, the controller 35 orders the column temperature regulator 18 to initiate the heating operation with a target temperature of 40 degrees Celsius. According to this order, a heating current is supplied to the heater 16, so that the column rack 15 and the trap column 14 held therein are maintained at approximately 40 degrees Celsius (Step S3). Concurrently, the controller 35 orders the gas temperature regulator 13 to initiate the heating operation with a target temperature of 40 degrees Celsius. According to this order, a heating current is supplied to the heater 11, so that the heat-exchange block 10 and the supply-side passage 8 contained therein are maintained at approximately 40 degrees Celsius (Step S4). The reason for setting the temperature at 40 degrees Celsius is to suppress thermal deterioration of the adsorbent in the trap column 14 and to prevent the target component captured on the adsorbent from being decomposed by the heat. If circumstances permit, it is possible to set those temperatures at higher levels.

Subsequently, the high-pressure six-port valve 7 is switched to the connection configuration indicated by the solid lines in FIG. 1, and the on/off valve 6 is opened to supply nitrogen gas into the supply-side passage 8 (Step S5). Then, when the nitrogen gas passes through the heat-exchange block 10, it is heated to approximately 40 degrees Celsius before it flows into the trap column 14. Immediately before the supply of the nitrogen gas, the supply-side passage 8 and the trap column 14 are filled with water. After the supply of the nitrogen gas is initiated, the nitrogen gas physically thrusts the water upwards and extrudes it from the outlet end 14b on the upper side of the trap column 14. This physical extrusion of water takes place within a relatively short period of time. Meanwhile, after a certain amount of water is ejected, the water remaining on the inner wall of the trap column 14 and the surface of the adsorbent is vaporized due to exposure to the heated nitrogen gas and carried away by the flow of nitrogen gas. Throughout this process, the trap column 14 is maintained at approximately 40 degrees Celsius, and the nitrogen gas is also maintained at approximately that same temperature. Therefore, the heat-exchange process efficiently proceeds within the trap column 14, so that the residual water is quickly vaporized and displaced from the inside of the trap column 14.

After being ejected from the outlet end of the trap column 14 in the previously described manner, the nitrogen gas carrying the water and vapors flows through the discharge-side passage 20, to be ejected through the disposal passage 24 to the disposal port via the two-way selector valve 20. The time required for the residual water to be almost completely removed from the trap column 14 can be experimentally determined beforehand. Accordingly, the controller 35 repeatedly checks whether an experimentally determined water-removal period has elapsed since the initiation of the supply of nitrogen gas (Step S6). When it is determined that the water-removal period has elapsed and hence the water in the trap column 14 has been adequately removed, the on/off valve 6 is closed to discontinue the supply of nitrogen gas (Step S7). Simultaneously, the temperature regulations of the trap column 14 and the nitrogen gas by the column temperature regulator 18 and the gas temperature regulator 13 are also discontinued (Step S8).

The previously described process of removing the water in the trap column 14 is followed by a process of eluting the target compound captured in the trap column 14 and then vaporizing and drying the eluate. In this process, the preparative fraction collection head 21 is initially moved to a position above the collection container 27 to be used for collecting the target compound. Subsequently, the head 21 is lowered to an appropriate position where the nozzles 23a and 25a are inserted into the container 27. The controller 35 switches the selector valve 4 to connect the eluting solvent container 3 (port d) and the pump 5, while resetting the high-pressure six-port valve 7 to the connection configuration indicated by the dotted line in FIG. 1. Then, the pump 5 draws dichloromethane from the eluting solvent container 3 and delivers it through the supply-side passage 8 to the inlet end 14a of the trap column 14a (Step S9). Dichloromethane is a solvent having a strong elution power. Therefore, when this solvent flows through the trap column 14, the target compound captured by the adsorbent is eluted. As a result, a flow of dichloromethane containing the target compound exits from the outlet end 14b and flows into the discharge-side passage 20.

After the supply of dichloromethane is initiated, the two-way selector valve 22 is switched to the connection configuration indicated by the solid lines in FIG. 1 (Step S10) and the on/off valve 26 is opened to initiate the supply of nitrogen gas into the gas supply passage (Step S11). Additionally, a heating current is supplied from the container temperature regulator 31 to the heater 29 to initiate the heating of the container rack 28 and thereby the heating of the collection containers 27 (Step S12). The target temperature at this stage may be approximately equal to or somewhat higher than the boiling point of dichloromethane, i.e. 40 to 45 degrees Celsius. The supply of nitrogen gas and the heating of the collection containers 27 may be initiated before the preparative separation process is initiated.

The eluate containing the target compound passing through the discharge-side passage 20 flows through the preparative separation passage 23 and eventually drips from the solution nozzle 23a. Due to the closely located flow of gas ejected from the gas ejection nozzle 25a, the dripped eluate does not directly fall down but is broken into fine droplets and scattered around. As stated earlier, the collection containers 27 are heated to a temperature that approximately equals the boiling point of dichloromethane. Therefore, when a fine droplet adheres to the inner circumferential wall or inner bottom wall of the collection container 27, the solvent (i.e. dichloromethane) in the droplet immediately vaporizes, leaving the target compound in solid forms. Thus, the target compound is accumulated on the inner circumferential wall and inner bottom wall of the collection container 27. If water were contained in the eluate, the solvent in the droplet would not immediately vaporize; the eluate would deposit on the bottom of the collection container 27, so that it would require a considerable length of time to obtain the target compound in solid forms. The system according to the present embodiment adequately removes water beforehand by the previously described process, so that the solvent can be quickly vaporized to obtain the solid.

After a certain period of time has elapsed from the initiation of the introduction of dichloromethane into the trap column 14, the concentration of the target compound in the eluate sharply declines. Accordingly, taking into account the internal volume of the trap column 14 (or the amount of adsorbent in the column) and the flow rate of dichloromethane supplied by the pump 5, the controller 35 calculates the elution time required for completely eluting the target compound and checks whether the time elapsed from the initiation of the supply of dichloromethane has reached the calculated elution time (Step S13). When the predetermined elution time has elapsed, the preparative separation process is discontinued by resetting the two-way selector valve 22 to the position for connecting the disposal passage (Step S14). Subsequently, the pump 5 is deactivated, the on/off valve 26 is closed to discontinue the supply of nitrogen gas, and the heating of the container rack 28 is discontinued. Thus, the preparative separation/purification work is discontinued (Step S15).

If the column rack 18 has another trap column 14 ready for the same process, it is only necessary to repeat the previously described steps.

Figure 3:
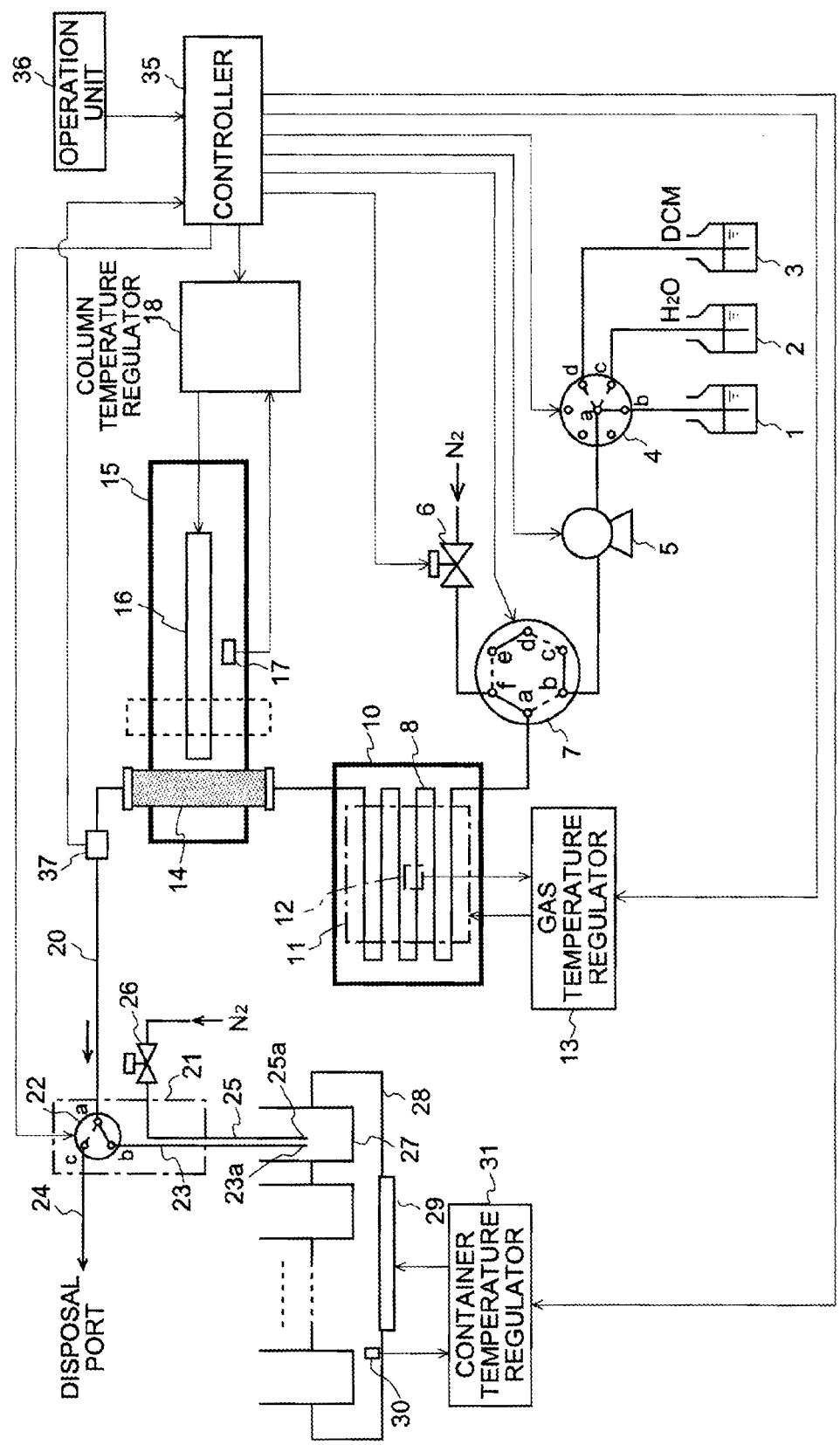
FIG. 3 a block diagram showing the main components of a preparative separation/purification system according to another embodiment of the present invention.

In the previous embodiment, the timing of discontinuing the drying process is determined by estimating the degree of removal of the water in the trap column 14 from the time elapsed from the initiation of the supply of nitrogen gas. Alternatively, as shown in FIG. 3, it is possible to provide a moisture sensor 37 for detecting the water concentration (humidity) of the gas flowing through the discharge-side passage 20, in which case the controller 35 can determine the timing of discontinuing the drying process by determining the progress in the removal of the water in the trap column 14 with reference to the detection signal of the moisture sensor 37. By this system, the water remaining in the trap column 14 can be more assuredly removed before the elution of the target compound. Furthermore, the preparative separation/purification process can be more efficiently performed since the system does not take an unnecessarily long period of time for removing the water.

It should be noted that any of the previously described embodiments is a mere example of the present invention; any change, modification or addition appropriately made within the spirit of the present invention will evidently fall within the scope of claims of this patent application.

The invention claimed is:

1. A preparative separation/purification system comprising:
   a source of a solvent having an elution capability;
   a source of a solution containing a target component;
   a trap column standing upright with an entrance at a bottom and an exit at a top;
   a gas supplier for supplying a drying gas into the trap column from the entrance; and
   a flow controller for flowing the solution containing the target component through the trap column to capture the target component in the trap column, for controlling the gas supplier to flow the drying gas into the trap column for a predetermined period of time or until a point in time when an inside of the trap column is judged to have been dried, and for supplying the solvent having the elution capability from the entrance of the trap column to collect the target component.

2. The preparative separation/purification system according to claim 1, which is characterized in that the gas supplier includes a passage selection means for changing a passage configuration so that either the drying gas, the solvent or the solution containing the target component is selectively supplied into the trap column.

3. The preparative separation/purification system according to claim 2, which is characterized by further comprising a gas-heating supplier for heating the drying gas supplied into the trap column.

4. The preparative separation/purification system according to claim 1, which is characterized by further comprising a gas-heating supplier for heating the drying gas supplied into the trap column.

5. The preparative separation/purification system according to claim 4, which is characterized by further comprising a column-heating supplier for heating the trap column.

6. The preparative separation/purification system according to claim 1, which is characterized in that:
   a moisture sensor is provided at an exit-side passage of the trap column; and
   the flow controller is configured for controlling the gas supplier such that the gas supplier supplies the drying gas to the trap column until a point in time when it is determined from a detection signal of the moisture sensor that the inside of the trap column has been dried.

7. The preparative separation/purification system according to claim 1, which is characterized in that the drying gas is an inert gas.

\* \* \* \* \*